June 18, 1957 — A. BARSKY — 2,796,112
AUTOMOBILE SAFETY SEAT
Filed March 16, 1956

INVENTOR.
AL BARSKY
BY
Harry Sargram
ATTORNEY

United States Patent Office 2,796,112
Patented June 18, 1957

2,796,112

AUTOMOBILE SAFETY SEAT

Al Barsky, Philadelphia, Pa.

Application March 16, 1956, Serial No. 571,907

2 Claims. (Cl. 155—9)

My invention relates to an automobile safety seat, and more particularly relates to a safety seat to prevent passengers of an automobile from being hurled forward in the event of a crash or collision.

It has been found that the greatest danger in automobile collisions occurs from the occupants being thrown forward with great force against rigid interior surfaces of the vehicle itself, to their consequent injury and sometimes fatal result. Heretofore, the procedure for restraining the passengers from freely tumbling about during a crash has been the employment of securing straps or harnesses affixed to their persons during the entire ride. While these strapping devices integrated the passengers with the automobile, such harnesses hampered and seriously restricted freedom of movement, consequently interfering with driving comfort. Furthermore, because of the impending discomfort, there has been a tendency for the average pasenger to entirely neglect the harness fastening procedure.

It is, therefore, an object of my invention to construct an automobile safety seat which will effectively harness the passengers in the event of a crash without restricting freedom of movement during ordinary travel.

Another object of my invention is to construct an automobile safety seat wherein body engirdling straps and harnesses are eliminated.

Another object of my invention is to provide an automobile safety seat wherein the position of the passenger's body during a crash will afford maximum protection against injury.

Other objects of my invention are to provide an improved device of the character described, that is easily and economically produced, which is sturdy in construction, and which is highly effective in operation.

With the above and related objects in view, my invention consists in the details of construction and combination of parts as will be more fully understood from the following description, when read in conjunction with the accompanying drawing in which.

Referring now in greater detail to the drawing in which similar reference characters refer to similar parts, I show an automobile safety seat embodying my invention comprising a seat element, generally designated as A, a frame, generally designated as B, and a yoke, generally designated as C.

Figure 1:
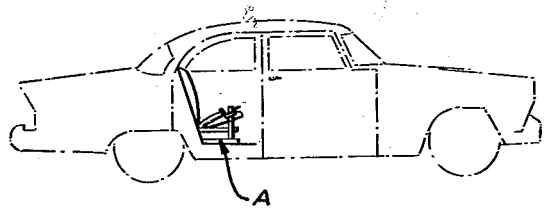
Fig. 1 is a side elevational view of an automobile having incorporated therein a safety seat embodying my invention.
Figure 2:
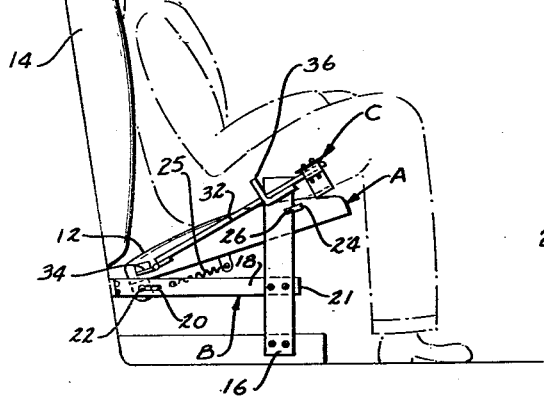
Fig. 2 is a side elevational view of the safety seat in normal riding position and showing the attitude of a passenger therein.
Figure 4:
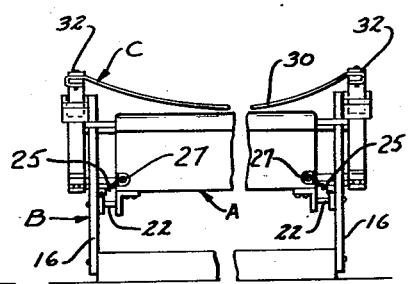
Fig. 4 is a front elevational view of the safety seat in normal riding position.
Figure 3:
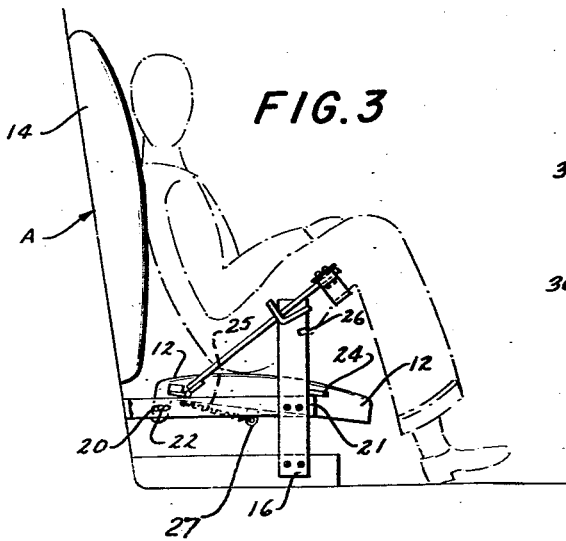
Fig. 3 is a side elevational view of the safety seat in an upset position after a crash or collision and showing the manner in which the passenger is securely wedged.
Figure 5:
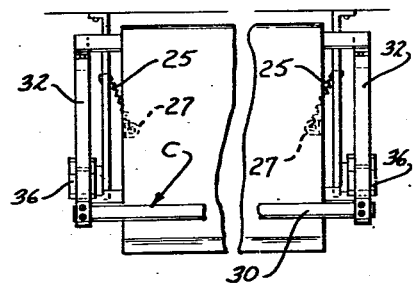
Fig. 5 is a top plan view thereof.

The seat element A includes a slidable cushion 12 upon which the passengers normally rest in an erect sitting position, and a back rest 14 which is permanently secured to the vehicle body. The normal position of the cushion 12 is shown in Figs. 2 and 4 wherein it is slightly inclined with the forward portion slightly elevated above the rear. In Fig. 3 is illustrated the crash position of the seat and the cushion 12 has dropped into a generally horizontal attitude with its forward portion slightly dipped below the rear.

The frame B comprises a pair of posts 16 secured in a vertical position upon the floor of the vehicle on each side of the seat element. Each of the posts 16 is further supported by a horizontal brace 18 affixed to an intermediate portion thereof, while the back end of the brace 18 is bolted to the vehicle at a point immediately below the back-rest 14. Each of the horizontal braces 18 has an elongated slot 20 which slidably supports the rear portion of the cushion 12. The forward end of the braces 18 extend slightly beyond the posts 16 to define a lip 21 for catching the seat cushion in its upset position.

The cushion 12 has at its rear portion on each side an outwardly projecting trunnion 22 on each side which interfit with and are retained by the slots 20 in the horizontal braces 18. At the forward portion of the cushion 12 and projecting from each side thereof is a lug 24 which is adapted to slidably engage a notch 26 in the vertical post. In the upset position of the safety seat these lugs 24 slip out of the notches 26 and catch upon the lips 21. A spring 25, affixed at one end to the brace 18 and at the end to an eye 27 secured to the bottom of the cushion, assists in maintaining the lugs 24 within the notches 26 during normal riding position.

The yoke C comprises a strap 30 which extends laterally across the top of the cushion 12 and is affixed at each end to an arm 32. The arms 32 are pivotally mounted at their lower ends to the cushion by a hinge 34. A bracket 36 having a slot therein is secured to the top of the posts 16 and slidably supports the upper portion of the arms 32.

As is apparent from the foregoing description of my automobile safety seat it operates as follows: The cushion 12 is set with the lugs 24 engaging the notches 26, so that the forward portion of the seat is slightly elevated above its rear. The passenger sits upon the cushion 12, as shown in Fig. 2, with his legs resting upon the straps 30. Although the drawing shows that the straps 30 are so adjusted for providing support for the passenger's legs while the seat is in normal riding position, it may be preferable, for purposes of comfort, to have the strap rest flush upon the entire upper surface of the cushion.

In the event of a crash or collision, inertia will cause the seat to be propelled forwardly and the lugs 24 will be disengaged from their notches 26. The length of the slots 20 limit the forward sliding movement of the trunnions 22 whereby the front edge of the cushion will drop with the lugs 24 falling upon the protruding lips 21. As the cushion slides forward, the height of the yoke strap will be elevated slightly because of the shorter lever distance of the arms 32 between the hinge 34 and the bracket 36. It is thus easily seen that the hindquarters of the passenger will drop with the seat and he will be wedged between the yoke strap 30 and the cushion 12.

Although my invention has been described in considerable detail, such description is intended as being illustrative rather than limiting, since the invention may be variously embodied, and the scope of the invention is to be determined as claimed.

I claim as my invention:

1. An automobile safety seat comprising a seat element, a frame and a yoke, said frame including a horizontal brace affixed to a vertical post and being disposed on each side of said seat element, said seat element having a cushion with a trunnion projecting outwardly from each side thereof, said trunnions being slidably supported in an elongated slot in said horizontal brace, a lug extending from the forward portion of each side of said cushion, said lugs being slidably supported in a notch on said vertical post, said yoke including a strap extending transversely across the upper surface of said cushion and being affixed to a pair of arms hingedly mounted on the sides of said cushion, and said arms being further slidably supported within a bracket secured to the top of each of said vertical posts whereby a passenger normally sitting on said cushion and across said strap will be wedged therebetween as a result of a crash causing the forward portion of said cushion to be forwardly projected out of its retaining notches and drop.

2. An automobile safety seat comprising a seat cushion, a frame, and a yoke, projecting means slidably supporting the rearward portion of said seat cushion upon said frame, engaging means detachably securing the forward portion of said seat cushion upon said frame in an elevated position with respect to the rearward portion thereof, and pivotal means securing said yoke to said seat cushion, said yoke being slidably supported in said frame in an elevated position whereby a passenger normally sitting upon said cushion and across said yoke will be wedged therebetween as a result of a crash causing the forward portion of said cushion to be forwardly projected and fall from said engaging means.

References Cited in the file of this patent
UNITED STATES PATENTS

| | | |
|---|---|---|
| 2,280,694 | Embree et al. | Apr. 21, 1942 |
| 2,660,222 | Woodsworth | Nov. 24, 1953 |
| 2,725,921 | Markin | Dec. 6, 1955 |
| 2,736,566 | Hartl | Feb. 28, 1956 |
| 2,738,829 | Rowe | Mar. 20, 1956 |